(12) United States Patent
Bailey et al.

(10) Patent No.: US 10,101,787 B1
(45) Date of Patent: Oct. 16, 2018

(54) ENERGY-AWARE VIRTUAL INFRASTRUCTURE

(75) Inventors: Daniel V. Bailey, Pepperell, MA (US); Qiyan Chen, Shanghai (CN); Robert B. Masson, Hingham, MA (US); Tianqing Wang, Shanghai (CN); Yun Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 669 days.

(21) Appl. No.: 13/076,747

(22) Filed: Mar. 31, 2011

(51) Int. Cl.
*G06F 1/32* (2006.01)

(52) U.S. Cl.
CPC .................................. *G06F 1/3206* (2013.01)

(58) Field of Classification Search
CPC .... G06F 1/3203; G06F 1/3206; G06F 9/5094; Y02D 10/24; Y02D 10/22; Y02D 10/28
USPC .......................... 718/102–107; 709/226, 241; 707/999.01; 713/300–340
See application file for complete search history.

(56) References Cited

U.S. PATENT DOCUMENTS

| | | | |
|---|---|---|---|
| 8,397,088 B1* | 3/2013 | Ghose | 713/300 |
| 2003/0135509 A1* | 7/2003 | Davis et al. | 707/100 |
| 2011/0072293 A1* | 3/2011 | Mazzaferri et al. | 713/340 |
| 2011/0282982 A1* | 11/2011 | Jain | 709/223 |

* cited by examiner

*Primary Examiner* — Igor N Borissov
(74) *Attorney, Agent, or Firm* — Krishnendu Gupta (57) ABSTRACT

Example embodiments of the present invention provide a method, apparatus and computer program product for determining a share of power consumption by an application executing on a server. The method includes obtaining metrics relating to operation of the server and obtaining metrics relating to server resource utilization attributable to the application. A transformation is then performed using the metrics relating to operation of the server and server resource utilization attributable to the application to determine the respective share of power consumption by the application executing on the server. Additionally, greenhouse-gases attributable to the application also may be calculated.

20 Claims, 8 Drawing Sheets

ENERGY-AWARE VIRTUAL INFRASTRUCTURE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to monitoring energy consumption in a computer network.

BACKGROUND

Energy efficiency has recently taken on a great deal of importance in Information Technology. Two major intertwined issues have driven this switch: (1) the realization that emission of Green-House Gases (GHGs), such as carbon dioxide, into the atmosphere threatens our well-being. As a major, long-term threat to humanity, much has been written on this subject. The management of GHGs lies at a volatile intersection of politics, economics, international relations and ecology. It is clear that policy makers worldwide will struggle with this problem for years to come.

SUMMARY

Example embodiments of the present invention provide a method, apparatus and computer program product for determining a share of power consumption by an application executing on a server. The method includes obtaining metrics relating to operation of the server and obtaining metrics relating to server resource utilization attributable to the application. A transformation is then performed using the metrics relating to operation of the server and server resource utilization attributable to the application to determine the respective share of power consumption by the application executing on the server.

BRIEF DESCRIPTION OF THE DRAWINGS

The above and further advantages of the present invention may be better under stood by referring to the following description taken into conjunction with the accompanying drawings in which.

DETAILED DESCRIPTION

As organizations migrate to virtualized Information Technology (IT) infrastructures, many have found that it is no longer necessary to own, operate, and maintain a dizzying array of servers and switches to run their businesses. Instead, it is more cost-efficient to outsource operations to a service provider. The provider can gain major economies of scale by consolidating the IT operations of many organizations into a single data center.

Sharing infrastructure resources saves on equipment costs. For example, a cloud service provider runs and maintains applications and charges the owner of the application a fee. Such a multi-tenant architecture allows applications from different organizations to use the same hardware simultaneously. Similarly, fewer IT managers are required to maintain the same quality of service. In addition, this architecture results in less equipment in use and therefore less power consumed. Given these dimensions of savings, service providers must be able to allocate the costs of their physical plant, equipment, and labor and charge them back to the user. These so-called "charge-back" mechanisms measure and bill for labor and equipment. However, traditional charge-back mechanisms do not capture power utilization.

In order to make cloud computing an attractive business proposition, one generally adopts a multi-tenant model. That is, several applications potentially tied to several different owners all running on the same physical machine. Costs could be allocated either by usage or by available space. However, customers are not willing to pay for capacity provided by the host but not used. Rather, accurate charge-back is necessary, including power, which is becoming the largest line item cost for running a data center.

Computing the power consumed by a virtualized application enables computation of a monetary value relating power consumption to power generation and transmission. This monetary value then may be reported to a charge-back accounting system for assessment to the application owner. Moreover, this data may be provided directly to users, administrators, auditors, or other consumers of such data for presentation in reports or a real-time "dashboard" display.

In addition, insight into the type of power consumed may be provided. For example, a specific value relating power consumption to equivalent tons of carbon dioxide emitted may be computed based on the power generation assets in use (e.g., coal, nuclear, natural gas, solar, etc.). For example, if we know that 70% of the electricity used is generated from burning coal, the remaining 30% comes from nuclear and that burning coal emits a certain amount of carbon dioxide per Watt (nuclear is essentially carbon-free), computation of the equivalent tons of carbon dioxide released is possible. Because the right to emit carbon dioxide is now an exchange-traded commodity, sources such as the Chicago Climate Exchange may be consulted to determine a financial cost associated with the VM's carbon emissions, taking into account the power-generation assets and specific VM utilization due to computation, memory, storage, network, and other considerations. These costs can be charged back to the application owner.

Additionally, VMs may be migrated to physical machines where power, optionally including the associated carbon-emissions cost, is cheapest. Such "space-shifting" of VMs allows minimization of the total costs (power and otherwise) of running an application.

Further, one need not be restricted to shifting in space, however. Some applications allow for "time shifting" as well. For example, a lengthy batch-oriented compute job that is processed with a potentially long lead-time can be assigned to be executed on a machine that offers the least cost power inclusive of any overhead charges for carbon dioxide emissions or other pollution.

Example embodiments of the present invention enable extending these traditional charge-back mechanisms by measuring, managing and assigning the value of power consumed by an application in a virtual machine (VM). Accordingly, example embodiments of the present invention are able to deliver a model that incorporates power utilization attributable to CPU, memory, storage, network and cooling. Cooling has a standard approach that is well-established. The description below describes in detail mechanisms that: (1) measure power consumed by a virtualized application; (2) calculate costs due to power generation and transmission; (3) calculate costs due to Green-House Gas emissions; (4) manage power consumption and associated costs by migrating a VM to a different physical plant; and (5) incorporate power costs into an overall valuation of services rendered.

CPU

For a majority of CPUs (e.g., AMD and Intel) power consumption is generally linear. See Standard Performance Evaluation Corporation SPECpower_ssj2008 benchmark and Georgios Varsamopoulos, Zahra Abbasi and Sandeep K. S. Gupta. *Trends and Effects of Energy Proportionality on Server Provisioning in Data Centers*, International Conference on High Performance Computing Conference (HiPC10), Goa, India, December 2010, both of which are herein incorporated by reference in their entirety. Accordingly, knowing power consumption at 0 and 100% load, one can calculate power consumption under any load with high accuracy. Although there may be minor fluctuations in power consumption (e.g., oddities in particular hardware, anomalies in power consumption, etc.), such a linear model is generally accurate enough to provide calculated power consumption based on CPU load.

Figure 1:
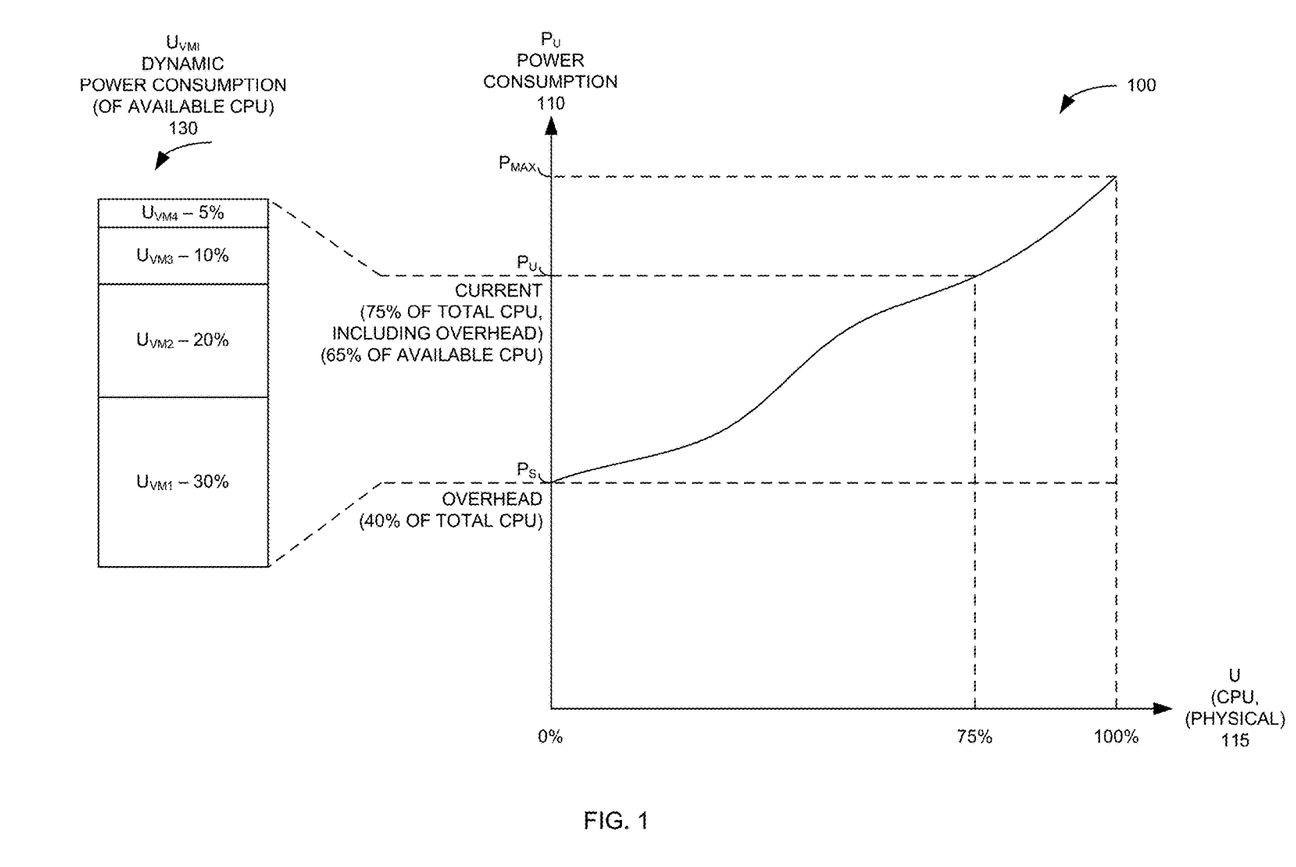
FIG. 1 is a chart illustrating central processing unit (CPU) power consumption as a function of CPU load and its distribution to virtual machines.

FIG. 1 is a chart 100 illustrating physical central processing unit (CPU) power consumption ($P_U$) 110 as a function of physical CPU load 115 (U) and its attribution to overhead to operate a server (PS) to virtual machines (VMs) hosted by the server ($U_{VMI}$). In its most common embodiment, a cloud application runs on a virtualized machine platform, such as VMware VSphere® by VMware of Palto Alto, Calif. Virtual machines hosted on the platform may include ESX® by VMware. Accounting tools within VMware VSphere® provide rudimentary figures on resource utilization. For example, VMware VSphere®'s tools can provide a figure on the percentage of a physical CPU utilization (U) consumed by a virtual machine 130 ($U_{VMI}$), which can be rationalized to exclude CPU utilization attributable to overhead ($P_S$) as a percentage of available CPU.

Example embodiments of the present invention monitor the physical CPU's overall utilization (U) and are therefore able to measure the amount of power consumed by the CPU ($P_U$). By relating the relative dynamic CPU consumption percentage figures from VMware attributable to each VM ($U_{VMI}$) to the overall utilization (U), power consumption can be calculated on a per-VM basis ($P_{VMI}$).

Accordingly, the following equation captures the generally linear model illustrated in FIG. 1 for CPU power consumption ($P_U$) for a particular computer (e.g., a server):

$$P_U = P_S + (P_{MAX} - P_S) \times U$$

where:
- $P_U$ is the power consumption with a given utilization;
- $P_S$ is the overhead power consumption in a standby state (i.e., active idle)—the minimum power to sustain the server;
- $P_{MAX}$ is the maximum power consumption when the server is at full utilization; and
- U is the currently physical CPU utilization.

As illustrated in FIG. 1, a CPU's power consumption ($P_U$) may be partitioned into that attributable to overhead ($P_S$) (e.g., 40%) and that attributable to available CPU utilization ($P_U - P_S$) (e.g., 75%). The power consumption attributable to CPU utilization may be rationalized to exclude CPU utilization attributable to overhead, thereby reducing the amount of available CPU to, for example, 60% as illustrated in FIG. 1, which yields a rationalized CPU utilization percentage attributable to VMs of 65% of available CPU (i.e., $U_{VM1}=30\%$, $U_{VM2}=20\%$, $U_{VM3}=10\%$ and $U_{VM4}=5\%$).

Accordingly, power consumption attributable to a particular VM ($P_{VMI}$) may be calculated according to the following equation:

$$\begin{aligned}
P_{VMI} &= P_{SI} + P_{DI} \\
&= P_S \times U_{VMI} + P_D \times \frac{U_{VMI}}{U_{ESX}} \\
&= P_S \times U_{VMI} + (P_U - P_S) \times \frac{U_{VMI}}{U_{ESX}} \\
&= P_S \times U_{VMI} + ((P_{MAX} - P_S) \times U_{ESX}) \times \frac{U_{VMI}}{U_{ESX}} \\
&= P_S \times U_{VMI} + (P_{MAX} - P_S) \times U_{VMI} \\
&= P_{MAX} \times U_{VMI}
\end{aligned}$$

where:
- $P_U$: current power consumption of the VM host;
- $P_{MAX}$: the power consumption of the host while it's CPU usage is 100%;
- $P_S$: the overhead power consumption of the host while in standby;
- $P_D$: the power consumption of the host that changes dynamically with CPU usage;
- $P_{VMI}$: the power consumption attributable to a particular VM;
- $P_{SI}$: the overhead power consumption assessed to the particular VM;
- $P_{DI}$: the dynamic power consumption assessed to the particular VM;
- U: the physical CPU usage of the host;
- $U_{VMI}$: the CPU usage that the particular VM utilized in the host (%) (physical); and
- $U_{ESX}$: the CPU usage of the host.

Overhead ($P_S$) and maximum ($P_{MAX}$) both can be measured for a particular host computer.

Figure 2:
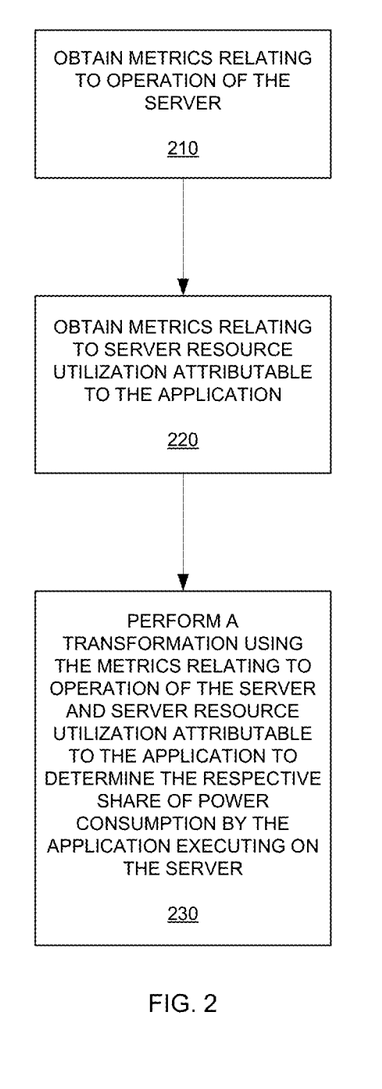
FIG. 2 is a flow diagram illustrating an example method according to an example embodiment of the present invention.
Figure 3:
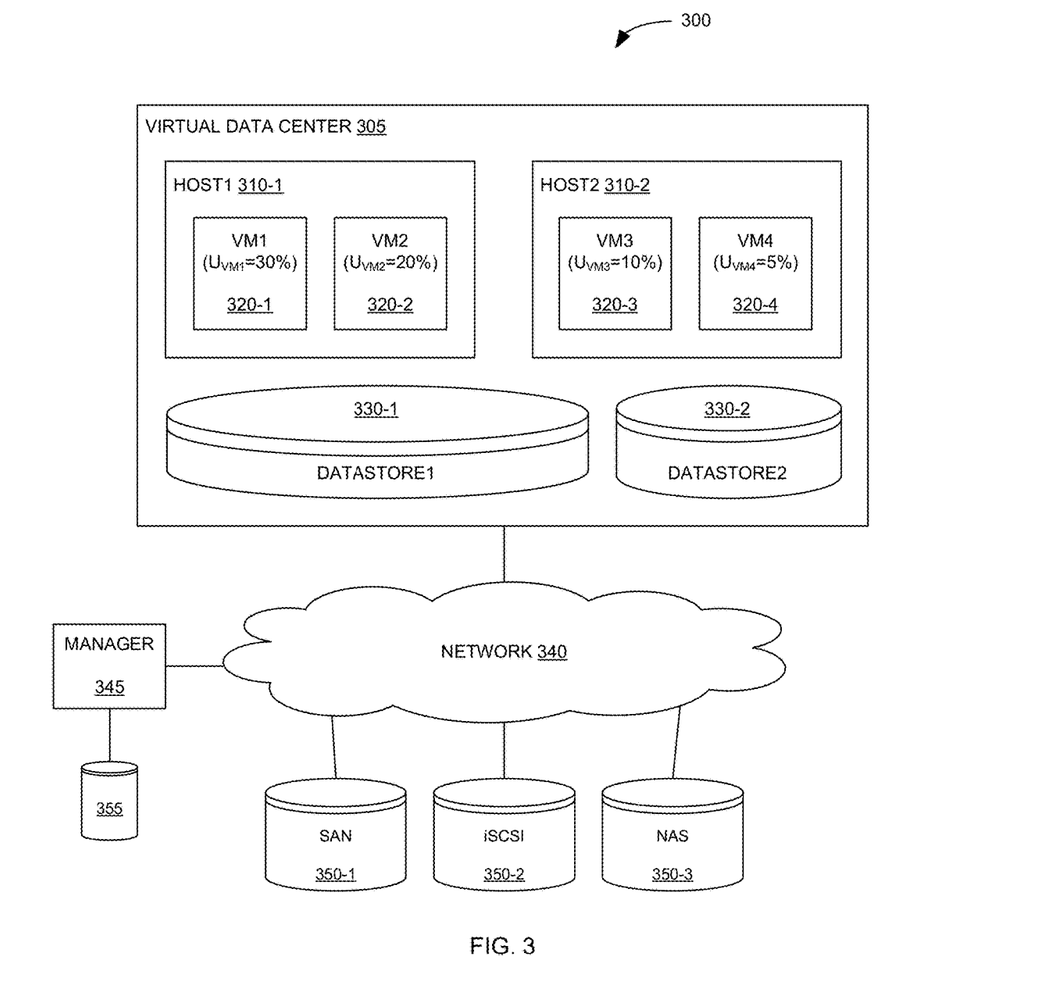
FIG. 3 is a block diagram of power consumption attributable to respective virtual machines in a virtualized storage environment.

FIG. 2 is a flow diagram illustrating an example method for determining a share of power consumption by an application executing on a server according to an example embodiment of the present invention and is intended to be viewed in conjunction with FIG. 3 and its associated description.

FIG. 3 is a block diagram of power consumption attributable to respective virtual machines (VMs) 320-1, 320-2, 320-3, 320-4 (320 generally) in a virtualized storage environment 300. The virtualized storage environment includes a virtual data center 305 having hosts 310-1, 310-2 (310 generally) hosting virtual machines (VMs) 320-1, 320-2, 320-3, 320-4 (320 generally), respectively, and datastores 330-1, 330-2 (330 generally); a network 340 and storage including a storage area network (SAN) 350-1, Internet Small Computer System Interface (iSCSI) 350-2 and network attached storage (NAS) 350-3 (350 generally). CPU utilization attributable to respective virtual machines 320 is provided with metrics ($U_{VMi}$) corresponding to those illustrated in FIG. 1.

As illustrated in FIGS. 2 and 3, example embodiments of the present invention determine a share of power consumption by an application (e.g., a VM 320) executing on a server (e.g., a host 310) by obtaining metrics relating to operation of the server (210) (e.g., $P_{MAX}$). Metrics relating to operation of the server may be stored in a database 355 accessible by a manager 345. Additionally, metrics relating to server resource utilization attributable to the application (e.g., the VM 320) (220) (e.g., $U_{VMi}$) are obtained. For example, the manager 345 may be configured to receive metrics regarding the percentage of a physical CPU utilization (U) consumed by a virtual machine 320 ($U_{VMi}$) from the virtual machine platform, such as VSphere® from VMware, and store them to the database 355. Accordingly, power consumption attributable to each particular VM 320 (e.g., $P_{VMi}$) can be calculated by the manager 345 as a function of the CPU utilization attributable to the VM 320 (e.g., $U_{VMi}$), respectively (e.g., $U_{VM1}$=30%, $U_{VM2}$=20%, $U_{VM3}$=10% and $U_{VM4}$=5%).

A transformation is then performed by the manager 345 using the metrics relating to operation of the server (e.g., the host 310) (i.e., $P_{MAX}$) and server resource utilization attributable to the application (e.g., the VM 320) (i.e., $U_{VMi}$) to determine the respective share of power consumption (U) by the application (e.g., the VM 320) executing on the server (e.g., the host 310) (230). Time series data (e.g., every 30 seconds) can be retained by the manager 345 in the database 355 to create a power consumption history that can be used to calculate overall power consumption by a particular VM 320 over a period of time for use in, for example, chargeback.

Network

Figure 4:
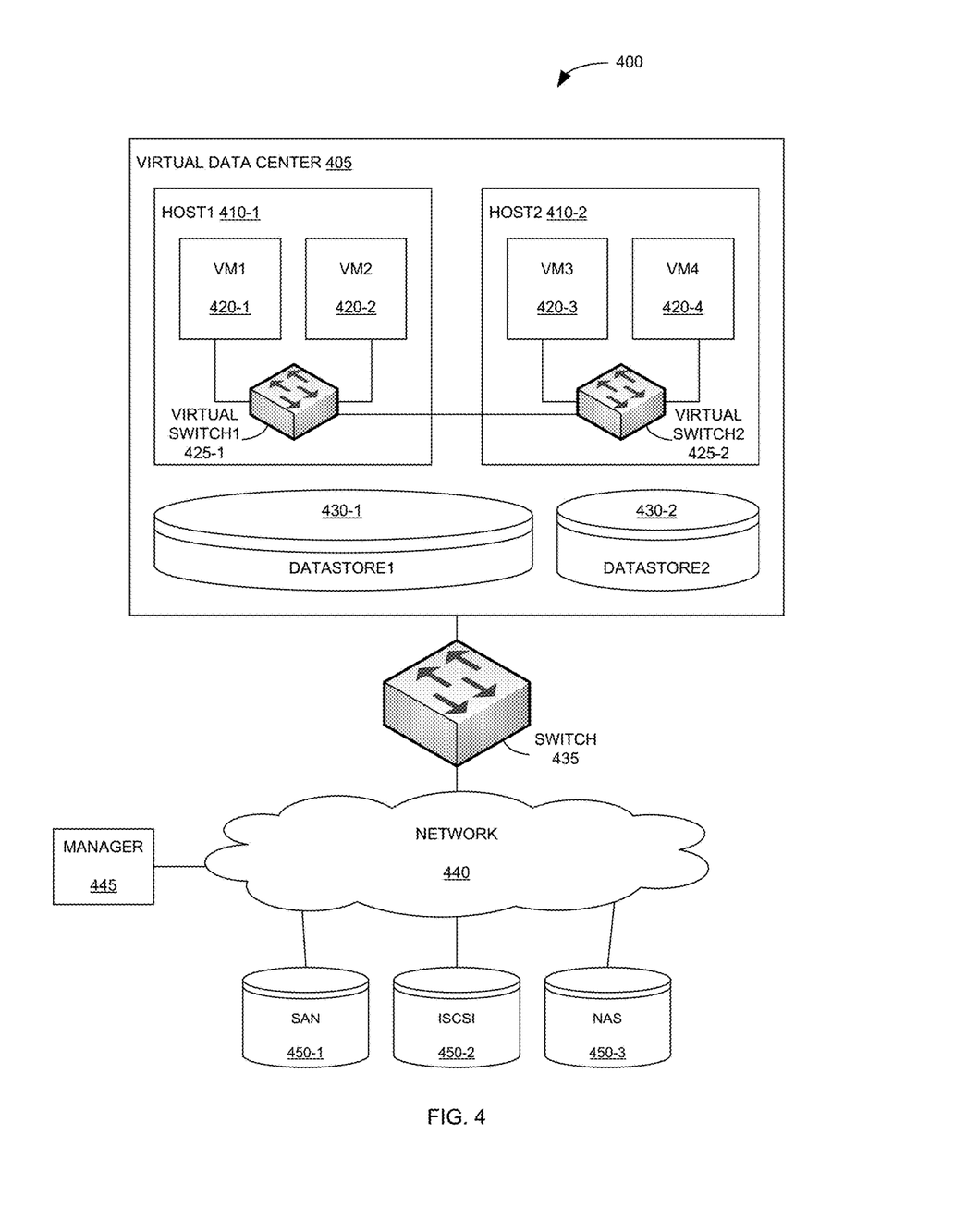
FIG. 4 is a block diagram of power consumption attributable to respective switches in a virtualized storage environment.

FIG. 4 is a block diagram of power consumption attributable to respective switches 425-1, 425-2, 435 in a virtualized storage environment 400. The virtualized storage environment 400 includes a virtual data center 405 having hosts 410-1, 410-2 (410 generally) hosting virtual machines (VMs) 420-1, 420-2, 420-3, 420-4 (420 generally), respectively, connected by virtual switches 425-1, 425-2 (425 generally) and datastores 430-1, 430-2 (330 generally); a switch 435, a network 340 and storage including a storage area network (SAN) 350-1, Internet Small Computer System Interface (iSCSI) 350-2 and network attached storage (NAS) 350-3 (350 generally).

In order for respective VMs 420 to communicate with each other, each host 410 creates a virtual switch 425 to handle network traffic between the respective VMs 420. For example, in ESX® from VMware, a virtual network switch is used by ESX® server to manage traffic between virtual machines, the service console, and the physical network adapters on the ESX® server machine (i.e., host) (not shown). It should be understood that network traffic handled by the virtual switch 425 may remain within the host 410. Physical (e.g., Ethernet) switches manage network traffic between machines (e.g., hosts) and has multiple ports, each of which can be connected to a machine or to another switch on the network.

Accordingly, example embodiments of the present invention are able to monitor both virtual network traffic (i.e., handled by the virtual switch 425) and determine physical network traffic (i.e., handled by the switch 435). However, it is difficult to distinguish power consumed by the host 410 for hosting the VMs 420 versus power consumed by the host 410 for running the virtual switch 425. Accordingly, the power cost associated with virtual network traffic may be included in the overhead cost attributed to each VM 420.

Additionally, many physical switches 435 make power usage metrics available. Alternatively, a power meter may be attached to the switch 435 to determine its power usage over a period of time. Example embodiments of the present invention are able to approximate power usage attributable to network traffic handled by a physical switch 435 by two methods. First, virtual network traffic metrics maintained by the host 410 may be obtained by the manager 445 and examined by, for example, packet usage and Internet protocol address. For example, VMware VSphere® provides network traffic metrics on a per-VM basis. Accordingly, a ratio of network traffic attributable to each VM 420 may be calculated for proportionately charging-back network traffic power consumption costs to each VM 420. Second, the percent CPU utilization attributable to each VM 420 ($U_{VMi}$) may be used to approximate a proportionate share of network traffic power consumption attributable to each VM 420.

Storage

In an enterprise there are many storage targets available for an application. With physical storage it is difficult to calculate the storage costs across these targets. The current trend of moving to virtualized storage adds to this complexity. Accordingly, example embodiments of the present invention calculate the total cost of storage (e.g., for a logical unit (LUN)) and apportion that cost based on two metrics: (1) the total storage utilization (i.e., LUN allocation) attributable to an application; and (2) the total storage (i.e., array) capacity.

Using the first metric, LUN power may be calculated as:

$$P_{LUN} = \frac{P_{ARRAY} \times LUNsize}{LUNallocation}$$

where:
 $P_{ARRAY}$ is the power required by an array (which may be measured by a meter);
 LUNsize is the size of the LUN (e.g., in GBs); and
 LUNallocation is the total LUN allocation (e.g., in GBs). In some cases it is the same as LUNsize and other times it is larger because it is a thin provisioned LUN.

Using the second metric, LUN power may be calculated as:

$$P_{LUN} = \frac{P_{ARRAY} \times LUNsize}{ArrayCapacity}$$

where:
 $P_{ARRAY}$ is the power required by an array (which may be measured by a meter);
 LUNsize is the size of the LUN (e.g., in GBs); and ArrayCapacity is the total array capacity available for use (e.g., in GBs).

Memory

Memory is never turned of and continues to consume power even when not in use because it is volatile. Accordingly, power consumption attributable to memory is considered a sunk cost associated with the CPU and is lumped into the overhead and is shared by VMs running on the host.

Cooling

As understood in the art, an industry standard exists for cooling charge-back.

Use Models

Figure 5A:
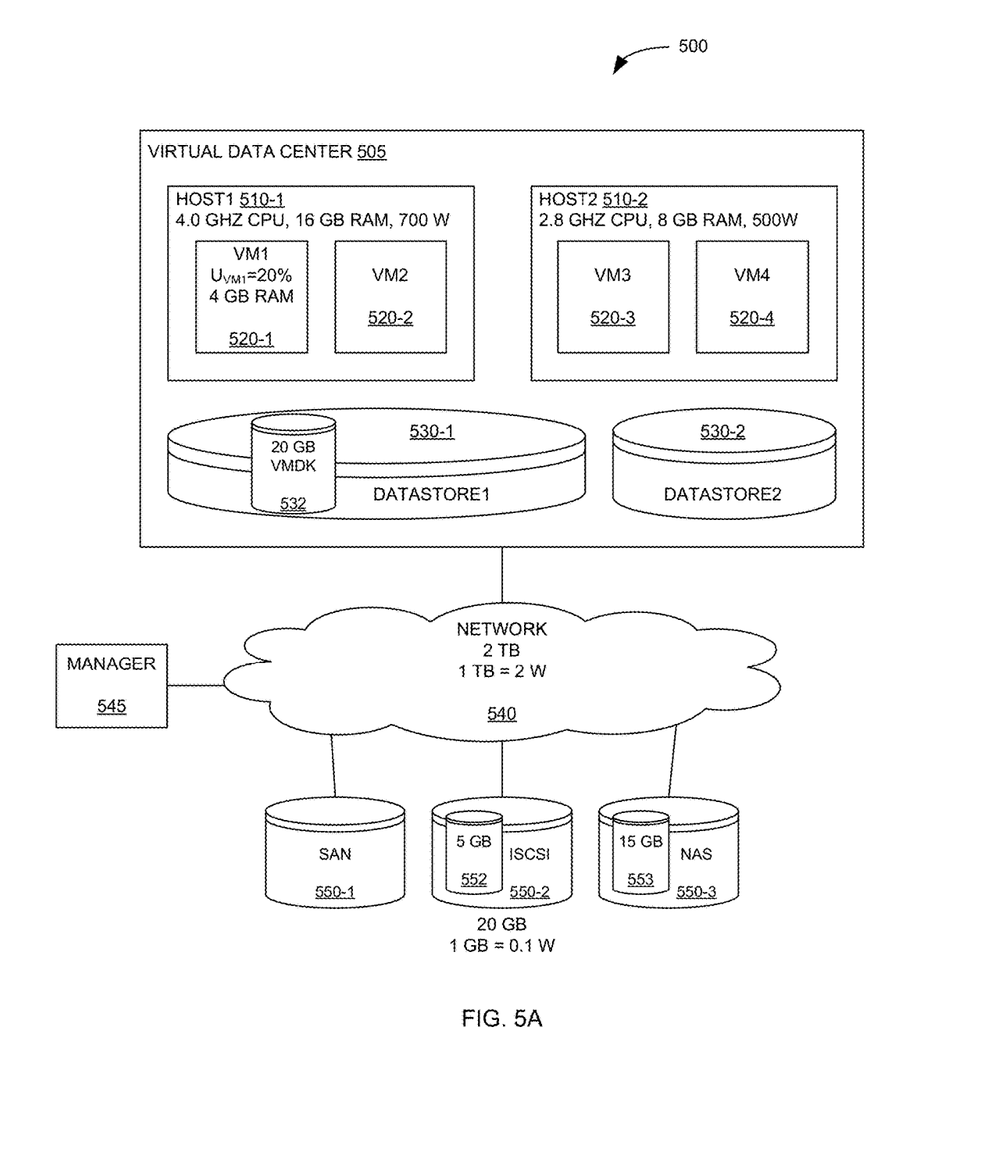
FIGS. 5A-5C are block diagrams of power consumption in respective use models.
Figure 5B:
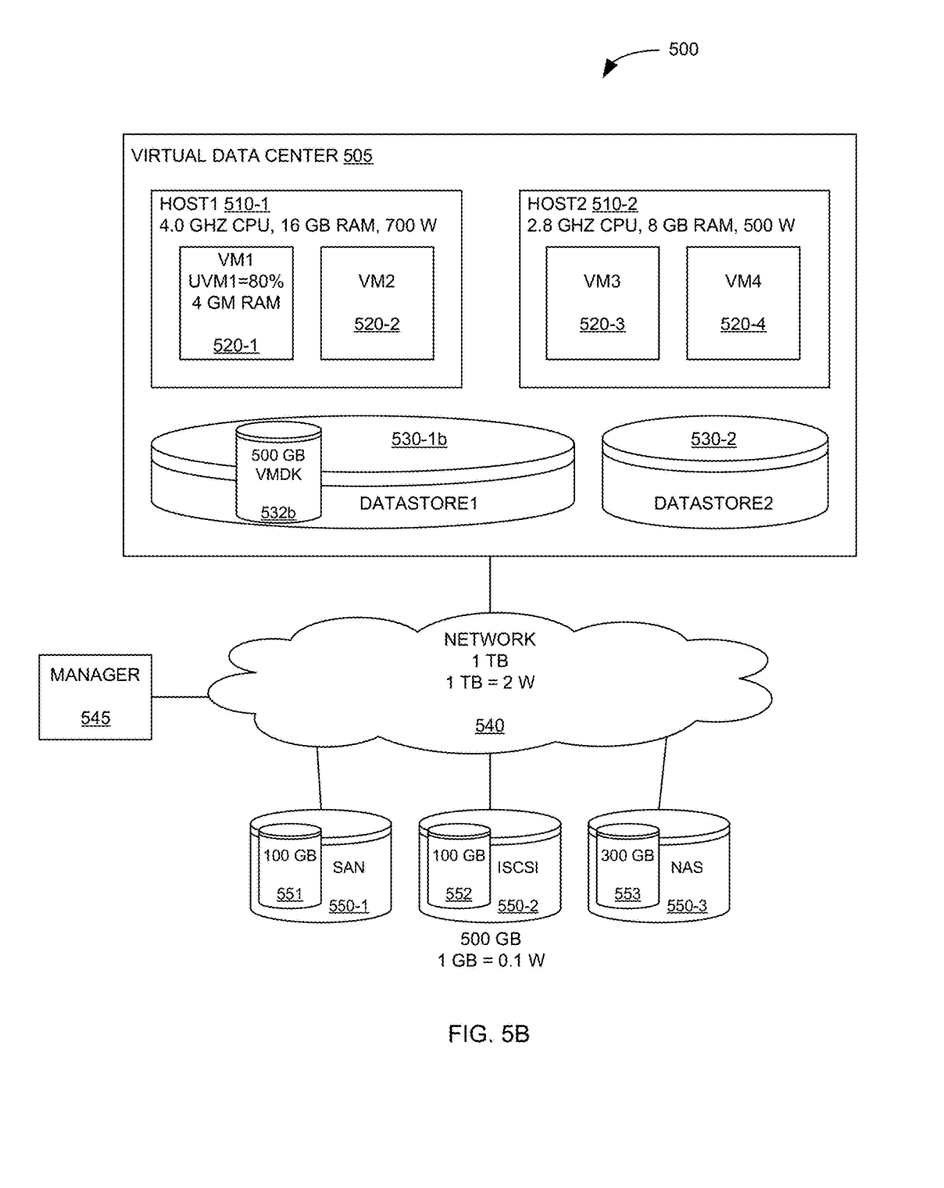
Figure 5C:
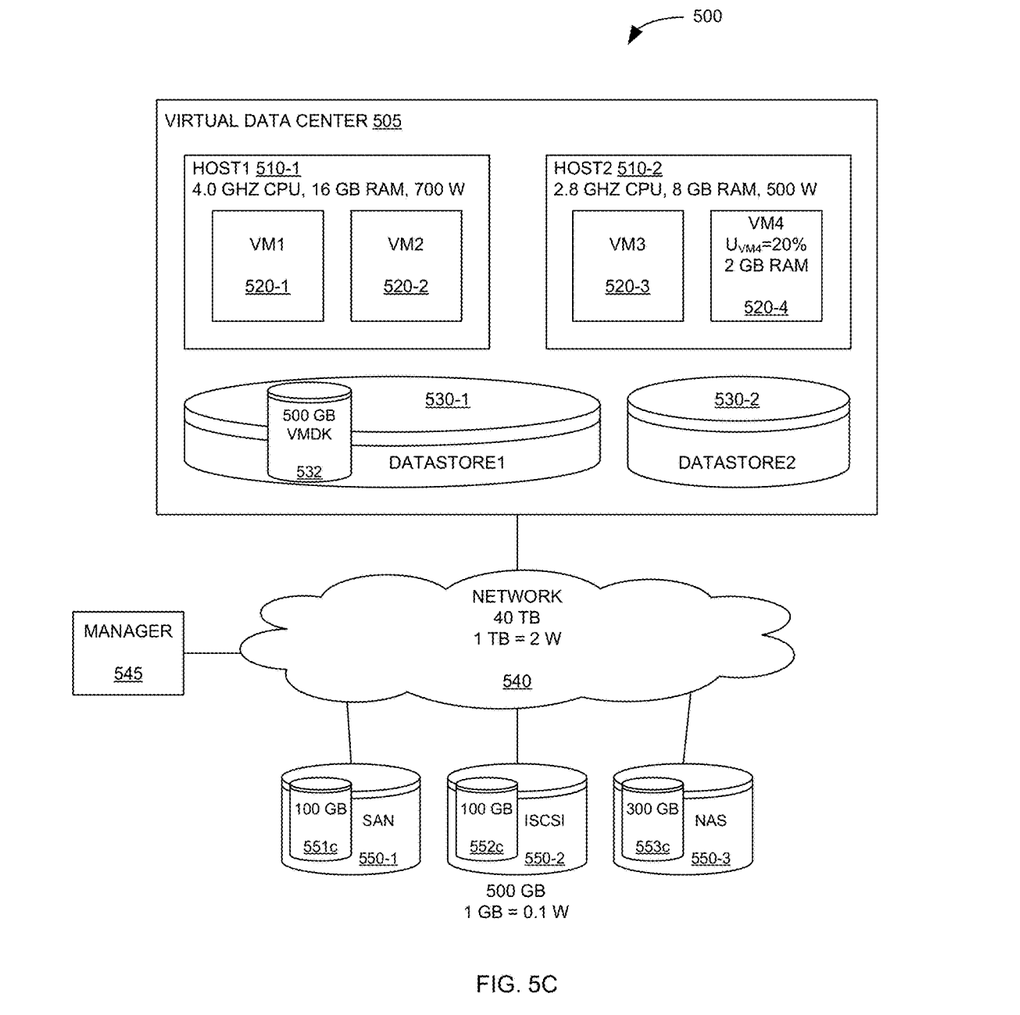

FIGS. 5A-5C are block diagrams of power consumption attributable to respective virtual machines (VMs) 520-1, 520-2, 520-3, 520-4 (520 generally) in virtualized storage environments 500a, 500b, 500c (500 generally) in respective use models. The virtualized storage environments 500 respectively include a virtual data center 505 having hosts 510-1, 510-2 (510 generally) hosting virtual machines (VMs) 520-1, 520-2, 520-3, 520-4 (520 generally), respectively, and datastores 530-1, 530-2 (530 generally); a network 540 and storage including a storage area network (SAN) 550-1, Internet Small Computer System Interface (iSCSI) 550-2 and network attached storage (NAS) 550-3 (550 generally).

FIG. 5A is a use model for online transaction processing (OLTP). OLTP typically utilizes little CPU, a medium amount of storage and high network traffic. In the example illustrated in FIG. 5A, CPU utilization of VM1 520-1 running on Host1 510-1 is 20% of Host1's 510-1 CPU. Additionally, the example uses a 20 GB virtual machine disk (VMDK) 532 on Datastore1 530-1 that is physically stored with 5 GB 552 on the iSCSI drive 550-2 and 15 GB 553 on the NAS 550-3. Further, network traffic may be, for example, 2 TB. Accordingly, the total power consumption, excluding cooling, required to host OLTP on VM1 520-1 may be calculated as:

$$P_T = P_{VM1} + P_{NETWORK1} + P_{STORAEGE1}$$
$$= (P_{MAX} \times U_{VM1}) + (TB \times W/TB) + (GB \times W/GB)$$
$$= (700\ W \times 20\%) + (2\ TB \times 2\ W/TB) + (20\ GB \times 0.1\ W/TB)$$
$$= 140\ W + 4\ W + 2\ W$$
$$= 146\ W$$

FIG. 5B is a use model for online analytical processing (OLAP). OLAP typically utilizes high CPU, a great amount of storage and little network traffic. In the example illustrated in FIG. 5B, CPU utilization of VM1 520-1 running on Host1 510-1 is 80% of Host1's 510-1 CPU. Additionally, the example uses a 500 GB virtual machine disk (VMDK) 532 on Datastore1 530-1 that is physically stored with 100 GB 551 on the SAN 550-1, 100 GB 552 on the iSCSI drive 550-2 and 300 GB 553 on the NAS 550-3. Further, network traffic may be, for example, 2 TB. Accordingly, the total power consumption, excluding cooling, required to host OLAP on VM1 520-1 may be calculated as:

$$P_T = P_{VM1} + P_{NETWORK1} + P_{STORAEGE1}$$
$$= (P_{MAX} \times U_{VM1}) + (TB \times W/TB) + (GB \times W/GB)$$

-continued
$$= (700\ W \times 80\%) + (1\ TB \times 2\ W/TB) + (500\ GB \times 0.1\ W/TB)$$
$$= 560\ W + 2\ W + 50\ W$$
$$= 612\ W$$

FIG. 5C is a use model for a web 2.0 application. Such application typically utilizes very little CPU, a great amount of storage and very high network traffic. In the example illustrated in FIG. 5C, CPU utilization of VM1 520-1 running on Host4 510-4 is 20% of Host4's 510-4 CPU. Additionally, the example uses a 500 GB virtual machine disk (VMDK) 532 on Datastore1 530-1 that is physically stored with 100 GB 551 on the SAN 550-1, 100 GB 552 on the iSCSI drive 550-2 and 300 GB 553 on the NAS 550-3. Further, network traffic may be, for example, 40 TB. Accordingly, the total power consumption, excluding cooling, required to host a Web 2.0 application on VM4 520-4 may be calculated as:

$$P_T = P_{VM4} + P_{NETWORK4} + P_{STORAEGE4}$$
$$= (P_{MAX} \times U_{VM1}) + (TB \times W/TB) + (GB \times W/GB)$$
$$= (500\ W \times 20\%) + (40\ TB \times 2\ W/TB) +$$
$$\quad (500\ GB \times 0.1\ W/TB)$$
$$= 100\ W + 80\ W + 50\ W$$
$$= 230\ W$$

Figure 6:
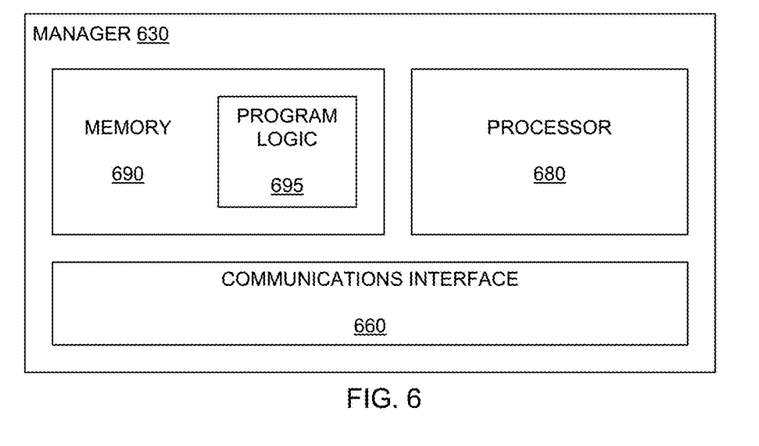
FIG. 6 is a block diagram of an example embodiment apparatus according to the present invention.

FIG. 6 is a block diagram of an example embodiment manager 630 according to the present invention. The manager 630 includes memory 690 storing program logic 695, a processor 680 and a communications interface 660.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the metadata server (i.e., computer) of FIG. 6, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 7:
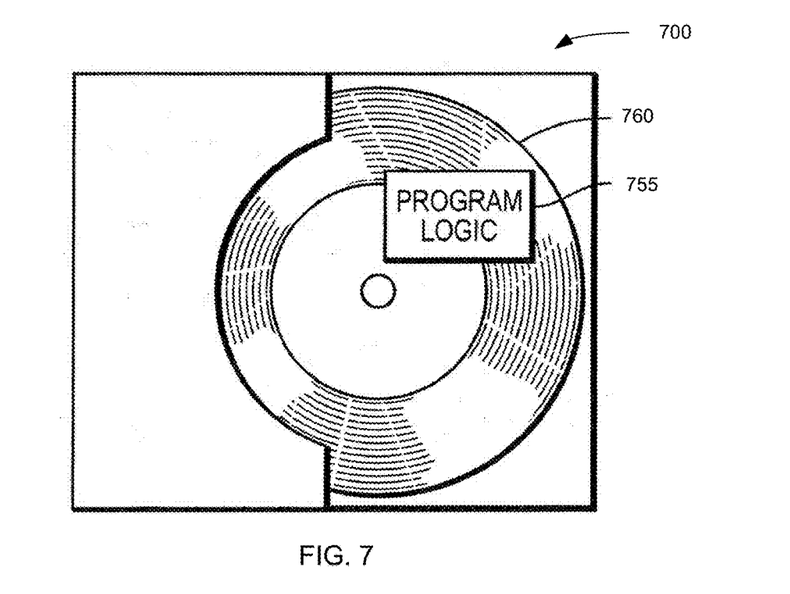
FIG. 7 is an illustration of an example embodiment of the present invention as embodied in program code.

FIG. 7 shows program logic 755 embodied on a computer-readable medium 760 as shown, and wherein the logic is encoded in computer-executable code configured for carrying out the gas controlling process of this invention and thereby forming a computer program product 700.

The logic for carrying out the method may be embodied as part of the aforementioned system, which is useful for carrying out a method described with reference to embodiments shown in, for example, FIGS. 1-5C. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method conducted by one or more processors for determining a share of power consumption attributable to a tenant virtual machine hosted by a virtual machine host hosting a plurality of virtual machines, the method comprising:
    obtaining, by a network manager apparatus from the virtual machine host, compute-level, network-level, and storage-level metrics relating to operation of the virtual machine host, including:
        a first utilization of a CPU of the virtual machine host ($U_{ESX}$);
        a second utilization of the CPU of the virtual machine host attributable to the tenant virtual machine ($U_{VMI}$);
        a total power consumption of the CPU of the virtual machine host at the first utilization ($P_U$); and
        a maximum power consumption of the virtual machine host at a full CPU utilization ($P_{MAX}$);
    obtaining, by the network manager apparatus from the virtual machine host, metrics relating to virtual machine host resource utilization attributable to the tenant virtual machine;
    computing, by the network manager apparatus, the share of power consumption attributable to the tenant virtual machine, excluding power consumption attributable to overhead of the virtual machine host hosting the tenant virtual machine, ($P_{VMI}$) according to the equation:

$$P_{VMI} = P_{SI} + P_{DI}$$
$$= P_S \times U_{VMI} + P_D \times \frac{U_{VMI}}{U_{ESX}}$$
$$= P_S \times U_{VMI} + (P_U - P_S) \times \frac{U_{VMI}}{U_{ESX}}$$
$$= P_S \times U_{VMI} + ((P_{MAX} - P_S) \times U_{ESX}) \times \frac{U_{VMI}}{U_{ESX}}$$
$$= P_S \times U_{VMI} + (P_{MAX} - P_S) \times U_{VMI}$$
$$= P_{MAX} \times U_{VMI},$$

where
    $P_S$ is an overhead power consumption of the virtual machine host;
    $P_D$ is a dynamic power consumption of the virtual machine host that changes dynamically with CPU utilization;
    $P_{SI}$ is a portion of the overhead power consumption of the virtual machine host attributable to the tenant virtual machine; and
    $P_{DI}$ is a portion of the dynamic power consumption of the virtual machine host attributable to the tenant virtual machine; and
    balancing virtual machine host load across a plurality of virtual machine hosts hosting respective virtual machines in a virtual data center according to the share of power consumption attributable to the tenant virtual machine.

2. The method of claim 1 wherein computing the share of power consumption attributable to the tenant virtual machine comprises calculating a portion of the virtual machine host storage capacity attributable to the tenant virtual machine.

3. The method of claim 1 wherein computing the share of power consumption attributable to the tenant virtual machine comprises calculating a portion of the virtual machine host data utilization attributable to the tenant virtual machine.

4. The method of claim 1 wherein obtaining metrics relating to virtual machine host resource utilization attributable to the tenant virtual machine comprises obtaining compute-level, network-level, and storage-level metrics relating to virtual machine host resource utilization attributable to the tenant virtual machine.

5. The method of claim 1 wherein computing the share of power consumption attributable to the tenant virtual machine comprises calculating a respective share of power consumption by the tenant virtual machine hosted by the virtual machine host according to a relation between power consumption of the virtual machine host and compute-level metrics relating to virtual machine host resource utilization attributable to the tenant virtual machine.

6. The method of claim 1 wherein obtaining compute-level, network-level, and storage-level metrics relating to operation of the virtual machine host comprises:
    measuring a first power consumption of the virtual machine host in an idle state; and
    measuring a second power consumption of the virtual machine host in a full-load state.

7. The method of claim 1 further comprising:
    storing time series data regarding the share of power consumption by the tenant virtual machine hosted by the virtual machine host; and
    charging a tenant for the respective share of power consumption by the tenant virtual machine hosted by the virtual machine host over a period of time according to the stored time series data.

8. The method of claim 7
    wherein computing the share of power consumption attributable to the tenant virtual machine comprises calculating a portion of greenhouse-gas emissions attributable to the tenant virtual machine according to a first relation between power consumption attributable to the tenant virtual machine and greenhouse-gas emissions; and
    wherein charging a tenant for the share of power consumption by the tenant virtual machine hosted by the virtual machine host over a period of time according to the stored time series data comprises calculating a respective share of greenhouse-gas emissions attributable to the tenant virtual machine according to a second relation between power consumption attributable to the tenant virtual machine and greenhouse-gas emissions attributable to the power consumed.

9. The method of claim 1 wherein balancing virtual machine host load across a plurality of virtual machine hosts hosting respective virtual machines in a virtual data center comprises balancing virtual machine host load across the plurality of virtual machine hosts according to a relation between power consumption and power cost.

10. The method of claim 9 wherein balancing virtual machine host load across the plurality of virtual machine hosts according to a relation between power consumption and power cost comprises calculating a cost according to a relation between greenhouse-gas emissions and power cost.

11. A network management apparatus for determining a share of power consumption attributable to a tenant virtual machine hosted by a virtual machine host hosting a plurality of virtual machines, the network management apparatus comprising:
 a processor; and
 memory encoded with a power consumption determination application that, when executed by the processor, causes the processor to:
  obtain, from the virtual machine host, compute-level, network-level, and storage-level metrics relating to operation of the virtual machine host, including:
   a first utilization of a CPU of the virtual machine host ($U_{ESX}$);
   a second utilization of the CPU of the virtual machine host attributable to the tenant virtual machine ($U_{VMI}$);
   a total power consumption of the CPU of the virtual machine host at the first utilization ($P_U$); and
   a maximum power consumption of the virtual machine host at a full CPU utilization ($P_{MAX}$);
  obtain, from the virtual machine host, metrics relating to virtual machine host resource utilization attributable to the tenant virtual machine; and
  compute the share of power consumption attributable to the tenant virtual machine, excluding power consumption attributable to overhead of the virtual machine host hosting the tenant virtual machine, ($P_{VMI}$) according to the equation:

$$\begin{aligned}P_{VMI} &= P_{SI} + P_{DI}\\ &= P_S \times U_{VMI} + P_D \times \frac{U_{VMI}}{U_{ESX}}\\ &= P_S \times U_{VMI} + (P_U - P_S) \times \frac{U_{VMI}}{U_{ESX}}\\ &= P_S \times U_{VMI} + ((P_{MAX} - P_S) \times U_{ESX}) \times \frac{U_{VMI}}{U_{ESX}}\\ &= P_S \times U_{VMI} + (P_{MAX} - P_S) \times U_{VMI}\\ &= P_{MAX} \times U_{VMI},\end{aligned}$$

where
 $P_S$ is an overhead power consumption of the virtual machine host;
 $P_D$ is a dynamic power consumption of the virtual machine host that changes dynamically with CPU utilization;
 $P_{SI}$ is a portion of the overhead power consumption of the virtual machine host attributable to the tenant virtual machine; and
 $P_{DI}$ is a portion of the dynamic power consumption of the virtual machine host attributable to the tenant virtual machine; and
 balancing virtual machine host load across a plurality of virtual machine hosts hosting respective virtual machines in a virtual data center according to the share of power consumption attributable to the tenant virtual machine.

12. The apparatus of claim 11 wherein the power consumption determination application further causes the processor to calculate a portion of the virtual machine host storage capacity attributable to the tenant virtual machine.

13. The apparatus of claim 11 wherein the power consumption determination application further causes the processor to calculate a portion of the virtual machine host data utilization attributable to the tenant virtual machine.

14. The apparatus of claim 11 wherein the power consumption determination application further causes the processor to obtain compute-level, network-level, and storage-level metrics relating to virtual machine host resource utilization attributable to the tenant virtual machine.

15. The apparatus of claim 14 wherein the power consumption determination application further causes the processor to calculate a respective share of power consumption by the tenant virtual machine hosted by the virtual machine host according to a relation between power consumption of the virtual machine host and compute-level metrics relating to virtual machine host resource utilization attributable to the tenant virtual machine.

16. The apparatus of claim 11 wherein the power consumption determination application further causes the processor to
 measure a first power consumption of the virtual machine host in an idle state; and
 measure a second power consumption of the virtual machine host in a full-load state.

17. The apparatus of claim 11 wherein the power consumption determination application further causes the processor to:
 store time series data regarding the share of power consumption by the tenant virtual machine hosted by the virtual machine host; and
 charge a tenant for the respective share of power consumption by the tenant virtual machine hosted by the virtual machine host over a period of time according to the stored time series data.

18. The apparatus of claim 11 wherein the power consumption determination application further causes the processor to balance virtual machine host load across the plurality of virtual machine hosts according to a relation between power consumption and power cost.

19. The apparatus of claim 18 wherein the power consumption determination application further causes the processor to calculate a cost according to a relation between greenhouse-gas emissions and power cost.

20. A computer program product having a non-transitory computer readable storage medium operable to store computer program logic embodied in computer program coded for determining a share of power consumption attributable to a tenant virtual machine hosted by a virtual machine host hosting a plurality of virtual machines, the computer program product comprising:
 computer program code for obtaining, by a network manager apparatus from the virtual machine host, compute-level, network-level, and storage-level metrics relating to operation of the virtual machine host, including:

a first utilization of a CPU of the virtual machine host ($U_{ESX}$);
a second utilization of the CPU of the virtual machine host attributable to the tenant virtual machine ($U_{VMI}$);
a total power consumption of the CPU of the virtual machine host at the first utilization ($P_U$); and
a maximum power consumption of the virtual machine host at a full CPU utilization ($P_{MAX}$);

computer program code for obtaining, by the network manager apparatus from the virtual machine host, metrics relating to virtual machine host resource utilization attributable to the tenant virtual machine; and computer program code for computing, by the network manager apparatus, the share of power consumption attributable to the tenant virtual machine, excluding power consumption attributable to overhead of the virtual machine host hosting the tenant virtual machine, ($P_{VMI}$) according to the equation:

$$P_{VMI} = P_{SI} + P_{DI}$$
$$= P_S \times U_{VMI} + P_D \times \frac{U_{VMI}}{U_{ESX}}$$
$$= P_S \times U_{VMI} + (P_U - P_S) \times \frac{U_{VMI}}{U_{ESX}}$$
$$= P_S \times U_{VMI} + ((P_{MAX} - P_S) \times U_{ESX}) \times \frac{U_{VMI}}{U_{ESX}}$$
$$= P_S \times U_{VMI} + (P_{MAX} - P_S) \times U_{VMI}$$
$$= P_{MAX} \times U_{VMI},$$

where $P_S$ is an overhead power consumption of the virtual machine host;

$P_D$ is a dynamic power consumption of the virtual machine host that changes dynamically with CPU utilization;

$P_{SI}$ is a portion of the overhead power consumption of the virtual machine host attributable to the tenant virtual machine; and $P_{DI}$ is a portion of the dynamic power consumption of the virtual machine host attributable to the tenant virtual machine; and computer program code for balancing virtual machine host load across a plurality of virtual machine hosts hosting respective virtual machines in a virtual data center according to the share of power consumption attributable to the tenant virtual machine.

\* \* \* \* \*